US008360858B2

(12) United States Patent
LaRocca et al.

(10) Patent No.: US 8,360,858 B2
(45) Date of Patent: Jan. 29, 2013

(54) SYSTEM AND METHOD FOR REWARDING GAME PLAYERS

(75) Inventors: Paul LaRocca, Westport, CT (US); Steven N. Kane, Brookline, MA (US); Dow Hardy, Marlborough, MA (US); Mark E. Herrmann, Wellesley, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 518 days.

(21) Appl. No.: 11/374,473

(22) Filed: Mar. 13, 2006

(65) Prior Publication Data

US 2006/0205461 A1 Sep. 14, 2006

Related U.S. Application Data

(60) Provisional application No. 60/661,094, filed on Mar. 11, 2005.

(51) Int. Cl.
*A63F 13/12* (2006.01)

(52) U.S. Cl. ................................ 463/25; 463/21; 463/42

(58) Field of Classification Search .................... 463/25, 463/16, 42, 43, 21; 705/14.12, 14.13, 14.14; 700/90, 91, 92, 93
See application file for complete search history.

(56) References Cited

U.S. PATENT DOCUMENTS

| | | | |
|---|---|---|---|
| 4,494,197 | A | 1/1985 | Troy et al. |
| 4,582,324 | A | 4/1986 | Koza et al. |
| 4,679,789 | A | 7/1987 | Okada |
| 4,689,742 | A | 8/1987 | Troy et al. |
| 4,725,079 | A | 2/1988 | Koza et al. |
| 4,764,666 | A | 8/1988 | Bergeron |
| 4,882,473 | A | 11/1989 | Bergeron et al. |
| 4,922,522 | A | 5/1990 | Scanlon |
| 5,158,293 | A | 10/1992 | Mullins |
| 5,324,035 | A | 6/1994 | Morris et al. |
| 5,373,440 | A | 12/1994 | Cohen |
| 5,377,975 | A | 1/1995 | Clapper, Jr. |
| 5,398,932 | A | 3/1995 | Eberhardt et al. |
| 5,569,082 | A | 10/1996 | Kaye |
| 5,586,937 | A | 12/1996 | Menashe |
| 5,628,684 | A | 5/1997 | Bouedec |

(Continued)

FOREIGN PATENT DOCUMENTS

WO WO 91/06931 5/1991

OTHER PUBLICATIONS

Rules of Pai Gow Poker. Casino City. Dec. 3, 2000. Online: http://web.archive.org/web/20001203170300/http://www.casinocity.com/rule/paigow.htm.

(Continued)

*Primary Examiner* — Damon Pierce
(74) *Attorney, Agent, or Firm* — Dority & Manning, P.A.

(57) ABSTRACT

A system and method are provided for rewarding players of games of chance. The game of chance may include, for example, a lottery-type game or a casino game. Individuals are provided the opportunity to earn extra rewards by forming teams or special groups of individuals; the team or special group must perform a particular task to obtain the extra reward. Such methods may help to maintain or increase the interest of a frequent lottery or game player, may provide a new or different incentive to attract new players, and may offer a means for a game operator to differentiate its player's club or rewards program from those of other operators. These organizations may include bingo hall operators (such as churches, senior centers, and charitable organizations), lottery agencies (such as those of United States of America state governments, or multi-state agencies like those for PowerBall and the Big Game, and Native American nations), and on-line and/or land-based casinos.

37 Claims, 5 Drawing Sheets

U.S. PATENT DOCUMENTS 5,645,485 A 7/1997 Clapper, Jr.
5,653,635 A 8/1997 Breeding
5,709,603 A 1/1998 Kaye
5,722,891 A 3/1998 Inoue
5,749,784 A 5/1998 Clapper, Jr.
5,768,382 A 6/1998 Schneier et al.
5,772,511 A 6/1998 Smeltzer
5,788,573 A 8/1998 Baerlocher et al.
5,791,990 A 8/1998 Schroeder et al.
5,810,664 A 9/1998 Clapper, Jr.
5,823,873 A 10/1998 Moody
5,823,874 A 10/1998 Adams
5,830,069 A 11/1998 Soltesz et al.
5,848,932 A 12/1998 Adams
5,860,653 A 1/1999 Jacobs
5,871,398 A 2/1999 Schneier et al.
5,882,258 A 3/1999 Kelly et al.
5,887,906 A 3/1999 Sultan
5,928,082 A 7/1999 Clapper, Jr. et al.
5,944,606 A 8/1999 Gerow
6,007,426 A 12/1999 Kelly et al.
6,012,983 A 1/2000 Walker et al.
6,028,920 A 2/2000 Carson
6,044,135 A 3/2000 Katz
6,048,269 A 4/2000 Burns et al.
6,059,289 A 5/2000 Vancura
6,077,163 A 6/2000 Walker et al.
6,106,393 A 8/2000 Sunaga et al.
6,146,272 A 11/2000 Walker et al.
6,152,823 A 11/2000 Lacoste et al.
6,159,097 A 12/2000 Gura
6,162,121 A 12/2000 Morro et al.
6,173,267 B1 1/2001 Cairns
6,179,711 B1 1/2001 Yoseloff
6,186,892 B1 2/2001 Frank et al.
6,203,427 B1 3/2001 Walker et al.
6,206,782 B1 * 3/2001 Walker et al. .................. 463/25
6,236,900 B1 5/2001 Geiger
6,251,017 B1 6/2001 Leason et al.
6,283,855 B1 9/2001 Bingham
6,311,976 B1 11/2001 Yoseloff et al.
6,312,334 B1 11/2001 Yoseloff
6,358,151 B1 3/2002 Enzminger et al.
6,364,765 B1 4/2002 Walker et al.
6,368,214 B1 4/2002 Luciano
6,368,218 B2 4/2002 Angell, Jr.
6,375,567 B1 4/2002 Acres
6,394,902 B1 5/2002 Glavich et al.
6,402,614 B1 6/2002 Schneier et al.
6,471,208 B2 10/2002 Yoseloff et al.
6,488,280 B1 12/2002 Katz et al.
6,514,144 B2 2/2003 Riendeau et al.
6,523,829 B1 2/2003 Walker et al.
6,527,175 B1 3/2003 Dietz et al.
6,540,230 B1 4/2003 Walker et al.
6,565,084 B1 5/2003 Katz et al.
6,572,107 B1 6/2003 Walker et al.
6,575,832 B1 6/2003 Manfredi et al.
6,582,307 B2 6/2003 Webb
6,582,310 B1 6/2003 Walker et al.
6,588,747 B1 7/2003 Seelig
6,607,439 B2 8/2003 Schneier et al.
6,612,501 B1 9/2003 Woll et al.
6,612,574 B1 9/2003 Cole et al.
6,619,660 B2 9/2003 Schaefer et al.
6,625,578 B2 9/2003 Spaur et al.
6,645,074 B2 11/2003 Thomas et al.
6,656,042 B2 12/2003 Reiss et al.
6,663,105 B1 12/2003 Sullivan et al.
6,676,126 B1 1/2004 Walker et al.
6,679,497 B2 1/2004 Walker et al.
6,681,995 B2 1/2004 Sukeda et al.
6,682,419 B2 1/2004 Webb et al.
D486,869 S 2/2004 Webb et al.
6,685,561 B2 2/2004 Anderson et al.
6,692,353 B2 2/2004 Walker et al.
6,705,944 B2 3/2004 Luciano
6,716,103 B1 4/2004 Eck et al.
6,719,631 B1 4/2004 Tulley et al.
6,729,956 B2 5/2004 Wolf et al.
6,733,385 B1 5/2004 Enzminger et al.
6,749,198 B2 6/2004 Katz et al.
6,786,824 B2 9/2004 Cannon
6,811,484 B2 11/2004 Katz et al.
6,824,467 B2 11/2004 Schlottmann et al.
6,843,724 B2 1/2005 Walker et al.
6,855,052 B2 2/2005 Weiss et al.
6,899,622 B2 5/2005 Lind et al.
6,918,589 B2 7/2005 Thibault
6,942,570 B2 9/2005 Schneier et al.
7,008,317 B2 3/2006 Cote et al.
2001/0049305 A1 12/2001 Riendeau et al.
2002/0013167 A1 1/2002 Spaur et al.
2002/0052229 A1 5/2002 Halliburton et al.
2002/0061778 A1 5/2002 Acres
2002/0077173 A1 6/2002 Luciano et al.
2002/0090986 A1 7/2002 Cote et al.
2002/0090987 A1 7/2002 Walker et al.
2002/0098882 A1 7/2002 Lind et al.
2002/0147040 A1 10/2002 Walker et al.
2002/0155885 A1 10/2002 Shvili
2002/0169018 A1 11/2002 Schneier et al.
2002/0187827 A1 12/2002 Blankstein
2002/0193158 A1 12/2002 Weiss et al.
2002/0198038 A1 12/2002 Adams
2003/0027628 A1 2/2003 Luciano
2003/0045340 A1 3/2003 Roberts
2003/0060257 A1 3/2003 Katz et al.
2003/0060261 A1 3/2003 Katz et al.
2003/0064807 A1 * 4/2003 Walker et al. .................. 463/42
2003/0069068 A1 4/2003 Kaminkow
2003/0080508 A1 5/2003 Thibault
2003/0102625 A1 6/2003 Katz et al.
2003/0114217 A1 6/2003 Walker et al.
2003/0119581 A1 6/2003 Cannon et al.
2003/0139214 A1 7/2003 Wolf et al.
2003/0155715 A1 8/2003 Walker et al.
2003/0176212 A1 9/2003 Schlottmann et al.
2003/0184012 A1 10/2003 Green
2003/0186739 A1 10/2003 Paulsen et al.
2003/0195841 A1 10/2003 Ginsberg et al.
2003/0218303 A1 11/2003 Walker et al.
2004/0025190 A1 2/2004 McCalla et al.
2004/0036212 A1 2/2004 Walker et al.
2004/0038723 A1 2/2004 Schneier et al.
2004/0051240 A1 3/2004 Adams
2004/0053683 A1 3/2004 Hartl et al.
2004/0063484 A1 4/2004 Dreaper et al.
2004/0102238 A1 5/2004 Taylor
2004/0102239 A1 5/2004 Samila
2004/0127279 A1 7/2004 Gatto et al.
2004/0133472 A1 7/2004 Leason et al.
2004/0142741 A1 7/2004 Walker et al.
2004/0147308 A1 7/2004 Walker et al.
2004/0152504 A1 8/2004 Herrmann et al.
2004/0204222 A1 10/2004 Roberts
2004/0259629 A1 12/2004 Michaelson et al.
2005/0049042 A1 3/2005 Walker et al.
2005/0075158 A1 4/2005 Walker et al.
2005/0258596 A1 11/2005 Such

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, “Wheel of Fortune (US Game Show)” Wikipedia, Nov. 13, 2007 <http://en.wikipedia.org/wiki/Wheel_of_Fortune_%28US_game_show%29>.
New Jersey, State Of, “Wheel of Fortune” New Jersey Lottery, Nov. 13, 2007 <http://www.state.nj.us/lottery/instant/ig409.htm>.
New Jersey, State Of, “Lots O' Spots Bingo” New Jersey Lottery, Dec. 6, 2007 <http://www.state.nj.us/lottery/instant/ig340.htm>.

* cited by examiner

SYSTEM AND METHOD FOR REWARDING GAME PLAYERS

RELATED APPLICATIONS

This application claims priority under 35 U.S.C. §119(e) to U.S. Provisional Application Ser. No. 60/661,094 entitled "SYSTEM AND METHOD FOR REWARDING GAME PLAYERS," filed on Mar. 11, 2005, which is herein incorporated by reference in its entirety.

FIELD OF THE INVENTION

The field of the invention relates generally to lotteries and gaming, and more particularly, to systems and methods for rewarding players of lottery-based games or casino-based gaming.

BACKGROUND

Numerous lottery agencies, land-based casinos, and on-line gaming operators or casinos have player clubs or player rewards programs. For example, the Maryland state lottery has a VIP Club for any individual that wants to receive special offers, notice of upcoming special events and promotions, advance notice of new games and game changes, a club newsletter, or exclusive club member prize drawings.

Casino rewards programs are usually tied to the amount of money an individual bets or spends at participating casinos. Most casinos or casino chains offer such programs. Some examples of such reward programs include Harrah's TOTAL REWARDS, Foxwoods' Casino's Wampum Rewards, and CasinoRewards for participating on-line casinos. These rewards programs may have one or more levels that may be tied to participation fees or volume. For example, the Harrah's TOTAL REWARDS program has three levels of membership: Gold, Platinum, and Diamond. A player is promoted to Platinum and then to Diamond membership as the player bets more money at a Harrah's casino in a calendar year. In addition, a player may also earn reward points by using an affiliated Visa card. The rewards or benefits for the member player include cash, free items, discounts at the gift shop or on casino services, and special services and events.

SUMMARY OF THE INVENTION

New and more interesting player incentives are needed to attract new players and to provide the frequent lottery and game players a greater incentive to continue to play or to play more often. New and more interesting player incentives also may be desired by a game operator (whether a lottery, land-based casino or on-line casino) to differentiate itself from other game operators.

According to one embodiment, there is provided a rewards program associated with at least one game, the rewards program comprising a storage element that stores information identifying at least two program members, a team identifier that links the at least two program members as members of a team, and a reward counter that stores rewards earned by any member of the team to accumulate a team reward. The game may be a game of skill or chance and may be operated by an organization (such as a casino or lottery agency) that offers the game. In one embodiment, the game includes at least one casino betting game. In one embodiment, the game includes at least one of poker, blackjack, keno, bingo, slots, and roulette. In one embodiment, the game includes a lottery. In one embodiment, the organization providing the game may be a lottery agency, a land-based casino, an on-line casino, or a bingo hall.

In another embodiment, the rewards program may include an individual reward counter that stores individual rewards earned for actions associated with the team. In one embodiment, the rewards program may include a reward adjustment counter that modifies the reward earned based on predefined characteristics. Rewards may be adjusted on the basis of frequent player credits, team frequent player credits, player account status, team account status, and may also include rolling over unearned team rewards.

The team reward may be divided among the team players equally or in proportion to each team member's contribution toward achieving the team reward. In one example, there may be a time limit imposed on the team in which to achieve the team reward. The team reward may be attained by playing (and not necessarily winning) a certain number of game sessions of the at least one game or multiple games. In one example, the team reward may include any of money, credit, merchandise, or loyalty points. In one embodiment, the team reward is evenly divided among the team members by the game operator. In one embodiment, the team reward is provided to the team as a whole. In one embodiment, the team reward is provided to the team members on a prorated basis. In one embodiment, the team reward is time-dependent or time constrained. In one embodiment, the team reward is not dependent upon winning of the at least one game by any of the team members. In one embodiment, the at least one game includes multiple games and wherein the team reward is game dependent. In one embodiment, the team reward includes at least one of money, credit, merchandise, and loyalty points.

According to another embodiment, there is provided a method of team gaming which comprises providing for a first player to join a rewards program, providing for a second player to join the rewards program, identifying the first and second players as members of a team, providing at least one team goal that is linked to the players participation in at least one game, and accumulating a team reward based on the players achieving the at least one team goal. The team goal may include requiring that the players play a predetermined number of game sessions of the at least one game within a predetermined time period. In one embodiment, the act of accumulating a team reward based on the players achieving the at least one team goal comprises an act of providing a team reward based on the players achieving the at least one team goal. In one embodiment, the method of team gaming further comprises acts of providing for the first player to invite the second player to become a member of a team and providing for the second player to accept an invitation to become a member of a team. In one embodiment, the method of team gaming further comprises an act of providing for a player to join a preexisting team. In one embodiment, the at least one game includes at least one of a game of chance, a casino betting game, and a lottery. In one embodiment, the method of team gaming is performed by a game operator that offers the at least one game. In one embodiment, the game operator includes at least one of a lottery agency, a land-based casino, an on-line casino, and a bingo hall. In one embodiment, the method of team gaming further comprises an act of adjusting the team reward based on predefined characteristics. Rewards may be adjusted on the basis of frequent player credits, team frequent player credits, player account status, team account status, and may also include rolling over unearned team rewards. In one embodiment, the method of team gaming comprises an act of providing an individual reward for actions associated with the team. In one embodiment, the method of team gaming comprises an act of distributing the team reward.

According to one aspect of the invention, a computer-readable medium is provided having computer-readable signals stored thereon that define instructions that, as a result of being executed by a computer, instruct the computer to perform a method for conducting a game. In one embodiment, the method comprises acts of providing for a first player to join a rewards program, providing for a second player to join the rewards program, identifying the first and second players as members of a team, providing at least one team goal that is linked to the players participation in at least one game, and providing a team reward based on the players achieving the at least one team goal. In one embodiment, the at least one team goal is limited by a predetermined time interval. In one embodiment, the method further comprises acts of providing for the first player to invite the second player to become a member of a team, providing for the second player to accept an invitation to become a member of a team. In one embodiment, the method further comprises an act of providing for a player to join a preexisting team. In one embodiment, the method of team gaming is performed by a game operator that offers the at least one game. In one embodiment, the method further comprises an act of adjusting the team reward based on predefined characteristics. In one embodiment, the method further comprises an act of providing an individual reward for actions associated with the team. In one embodiment, the method further comprises an act of distributing the team reward.

According to another aspect of the invention, a system if provided for playing a team game on a computer system. The system comprises means for means for providing for a first player to join a rewards program, means for providing for a second player to join the rewards program, means for identifying the first and second players as members of a team, means for providing at least one team goal that is linked to the players participation in at least one game, and means for providing a team reward based on the players achieving the at least one team goal.

BRIEF DESCRIPTION OF THE DRAWINGS

In the drawings in which like elements are represented by like reference numerals.

DETAILED DESCRIPTION

Figure 1:
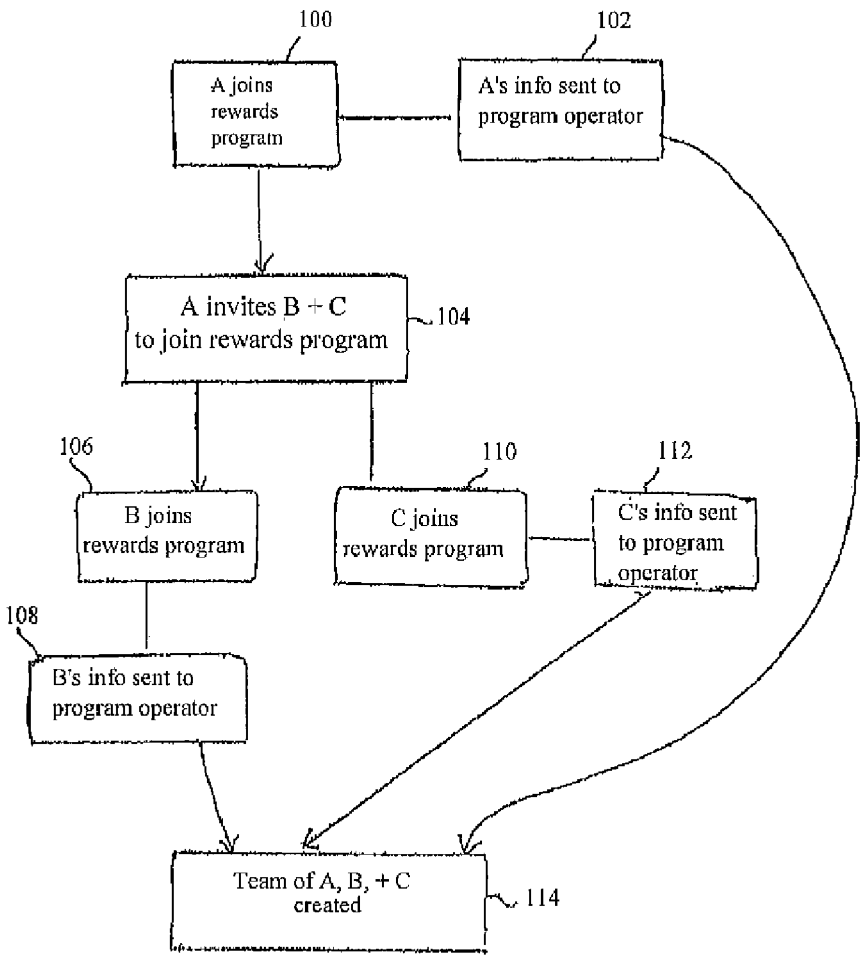
FIG. 1 is a flow diagram of one example of a method of creating a team according to aspects of the invention.

Various aspects and embodiments of the invention are directed to a system and methods for providing specific rewards or benefits for groups or teams of players participating in a rewards program. Such methods may help to maintain or increase the interest of a frequent lottery or game player, may provide a new or different incentive to attract new players, and may offer a means for a game operator to differentiate its player's club or rewards program from those of other operators.

Organizations that offer games of chance may include bingo hall operators (such as churches, senior centers, and charitable organizations), lottery agencies (such as those of United States of America state governments, multi-state agencies like those for PowerBall and the Big Game, and Native American nations), and on-line and/or land-based casinos. It is to be appreciated that the principles of the invention may be used by any game operator or organization that offers legal games of chance.

These and other game operators may have associated rewards programs and/or players' clubs (herein collectively referred to as rewards programs). The rewards program may be open to a few, some, most or all individuals that may play the games of chance offered by an organization. In one example, the rewards program may have no requirements to enter besides any legal requirements, such as, for example, age, name, and address. In another example, the rewards program may have other additional requirements such as, for example, credit card information, credit rating, and past play history with the gaming establishment. The rewards program may be free or may have an associated fee to join and/or to continue to be a member.

In one example, the rewards program may have requirements to continue to be a member, such as playing a minimum number of games or betting a certain amount of money in a given period of time, e.g., US$10 in an hour, 10 games in a month, or US$1,000 in a year. For example, the rewards program may have a requirement that uses an average value to determine whether to continue the membership of an individual (e.g., an average of 5 games per month for one year or US$25 per day for one week). The rules for joining and maintaining membership in a player club or reward program may be preferably readily available for review, such as at the gaming establishment, on a membership card, or on an Internet website.

According to one embodiment, an individual may sign up to join the rewards program through a cashier or through a remote means including telephone, handheld device, kiosk, computer through the Internet or other network and mail. As discussed above, an individual may need to pay for being a member, which may be performed using, for example, money or loyalty points. In particular, an individual may pay using money by debit card, credit card, check, cash, or from an account credit either with the gaming operator or an affiliated organization. Alternatively, a game player may pay using loyalty points from an account held either by the gaming operator or by the affiliated organization. Loyalty points may be obtained from any type of organization but are generally associated with loyalty programs such as frequent flier programs for airlines, frequent stay programs for hotels or frequent visitor programs for casinos. The game player may pay-in person using a cashier or through other remote methods including telephone, handheld device, kiosk, computer through the Internet or other network and mail.

According to one embodiment of the invention, a reward program may provide a team of individuals or group of players an extra reward for accomplishing a particular goal. The team of individuals may be any of two or more people that identify themselves as members of the team. In one preferred embodiment, the team may comprise three or more people. However, it is to be appreciated that the team may comprise any number of individuals, and may also be any combination of people that are already members of the reward program or are new members that join the reward program to specifically become members of the team.

Referring to FIG. 1, there is illustrated a flow diagram of one example of a method for a team to be identified by a rewards program. In a first step 100 an individual A signs up to join the reward program. In a next step 102, A's information is sent to and stored by the rewards program operator. A may then identify other individuals with whom A may wish to form a team. In step 104, A invites these individuals B and C to join the rewards program and A's team. It is to be appreciated that A may invite any number of other individuals to join and the invention is not limited to teams of three. One or more of these individuals may accept A's invitation and join the rewards program as members of A's team. For example, referring to FIG. 1, B may join the program (step 106) and the program operator may collect B's information (step 108), and C may also join the program (step 110) and have C's information collected by the program operator (step 112). The program operator may then create a team comprising A, B and C and store information that identifies each of A, B and C as team members.

It is to be appreciated that while FIG. 1 illustrates one example of a method of forming a team, many other methods exist and may be used. For example, an individual may join an existing team, thereby increasing team membership. In another example, two or more individuals may sign up to join the reward program and may identify other individuals who are already program members but not members of a team with who they intend to form a team. Thus, in any of these manners, a team of two or more players may be created and identified to the rewards program. It should be appreciated that numerous other methods may be used for identifying a team to a reward program, and that the methods given above are intended to be examples and not limiting as to the scope of the invention.

Figure 2:
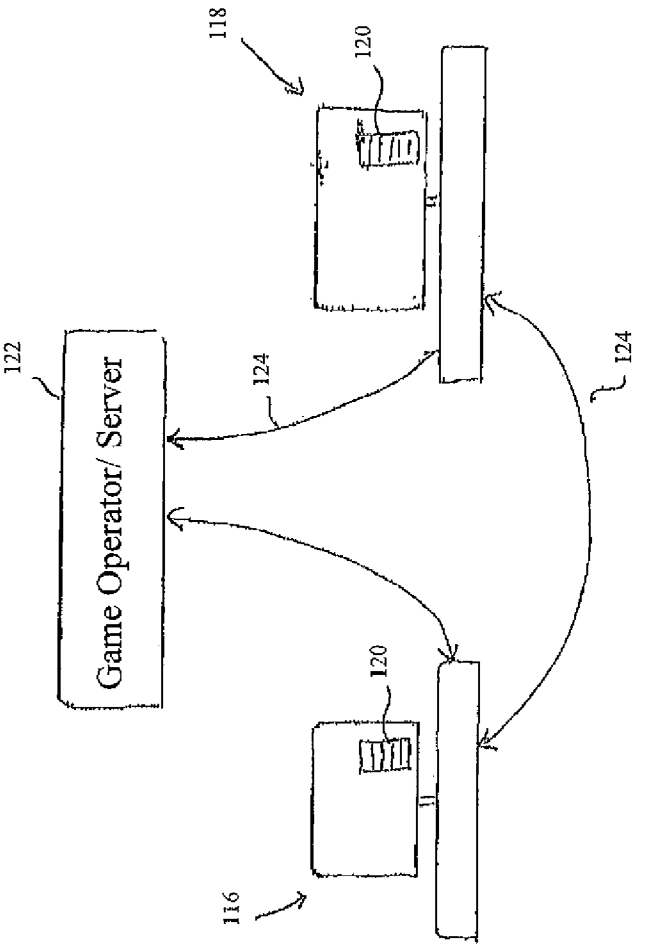
FIG. 2 is a diagram of one example of a team gaming system according to aspects of the invention.

As discussed above, a team rewards program may be offered by a number of game operators including land-based and online casinos. In one example, the operator may be (or may be affiliated with) an online casino or gaming environment and players may join teams online. For example, referring to FIG. 2, a first player using a terminal 116 may join the rewards program and start a team. The player may then identify and invite others to join the team, as shown by terminal 118. The terminals 116 and 118 may be any type of user interface coupled to a gaming environment including, but not limited to, personal computers that may be coupled to the gaming environment 122 and to each other via a network connection 124 such as, for example, the Internet. The terminals may also be computer terminals located at a land-based casino and networked to each other and to a casino game server 122 that provides access to one or more games. Each player who becomes a member of the team may view on their terminal a list 120 of team members. The team members may also view a record of one another's participation in games and progress toward team goals.

According to one embodiment, the members of the team may obtain team rewards by attaining certain accomplishments such as, but not limited to, playing a certain number of games in a given time period or achieving certain winnings. A few accomplishments may include, for example, any one team member or all team members being required to play a specific game a particular frequency (e.g., twenty times in one month) or that the whole team may be required to bet a particular aggregate amount in a certain time period (e.g., $100 in one month) in the gaming establishment. Other examples of possible required accomplishments may include, for example, playing a new game a specified number of times in a specified time period, spending a specified amount of money using the affiliate credit card in the casino, playing in a specific special event at the gaming establishment, purchasing a specified amount of lottery tickets in a specified time period, or betting a specific amount of money in a specified time period on a specific table game. It is to be appreciated that numerous other accomplishments may also be linked to awarding of team rewards points and the inventive principles are not limited to the examples given herein. The accomplishment required to obtain a team reward may be any action associated with the reward program. In addition, the required accomplishment may remain constant, be added to, or may constantly or periodically change. In some examples, accomplishments may be required to be performed by one, some, or all team members or by the team in total.

According to some embodiments, benefits or rewards may be in any form, including any legal monetary form, an account credit, loyalty points, service, or merchandise award. The team benefits or rewards may be stated as being a total team reward or benefit or as a reward or benefit given to each member of a team. The team benefit or reward may also be stated as being the total reward or benefit divided evenly or proportionately among all the teams that accomplish the stated goal. For example, five teams may divide evenly a total reward of $3000 for a reward of $600 per team. In another example, if a total team reward of $3000 were divided proportionately and one team out of five accomplished twice the stated goal, then that one team would receive a $1000 team reward and the other teams would receive $500 each. In another example, each team member may also be rewarded by having his or her status level in the membership club increased, e.g. from basic to gold or from gold to platinum, for being on a team that successfully accomplishes a stated team goal. Successful teams may also be rewarded by gaining better odds on all or specified games. In one example, the level by which the odds are improved may be determined by the team size or activity.

In one example, individuals may be paid a monetary award using cash or check or through a credit or debit card. Individuals may also be given credit through the reward program membership card or through a credit account held with the gaming operator or an associated organization. Alternatively, individuals may be paid using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. Furthermore, individuals may be paid in person using a cashier or electronically through any method known in the art. Individuals may be notified of attaining the team accomplishment and thus through other remote methods including telephone, handheld device, kiosk, computer through the Internet (or other network) and mail.

According to one embodiment, benefits or rewards for teams (or groups) may be provided to all members of the team with the team having responsibility for dividing the team benefit or reward. Alternatively, the gaming operator may place the team reward or benefit in a team account to which some or all team members may have access. The gaming operator may also pay the team reward or benefit to one team member (e.g., a team captain) for that individual to divide the team reward among the team members.

According to one preferred embodiment, the gaming operator may divide the team reward or benefit evenly among the team members and may credit each team player's account accordingly. As an alternative preferred method, the gaming operator may divide the team reward or benefit proportionately according to each team member's contribution toward obtaining the team reward or benefit. For example, for a team benefit of 5000 credits awarded to a team that plays 30 hands of a new poker game in one month, wherein a first team player plays six hands, and second and third team players play twelve hands each, the team award may be divided among the three players, awarding the first team player 1000 credits and each of the second and third team players 2000 credits, thereby awarding each for their contribution.

The team benefit or reward may also have adjustments for a team's account type or status, or may have adjustments for any individual team member's account type or status. For example, the team benefit or reward may increase if the team includes one or more players with a top-level account. The team reward or benefit may also be adjusted for numerous other criteria including frequent player or team credits. Of course, all adjustments to a team reward or benefit must meet any legal requirements for the gaming jurisdiction in which the game is played. The team reward or benefit may also be supplemented by a higher-level team reward or benefit that may accumulate over time if no team meets the supplemental goal in a given time period. For example, a team goal of playing a specific table game ten times in one month may have a supplemental goal of playing a specific table game 100 times in one month. The first goal may be attained easily by many teams, but it is possible that no team may meet the supplemental goal and thus the associated supplemental team reward of $5000 may roll over to the next posted supplemental team reward.

According to another embodiment, individuals may also attain additional benefits from the gaming operator through actions associated with teams. The additional benefit(s) may be any of those stated above given out in any of the methods given above. The additional benefit for an individual on a team may be attained by any specified methods including, for example, putting a team together, putting a specified number of teams together of a specific number of individuals, signing up a specified number of individuals, and having the above signed up individuals in turn sign up additional individuals.

The gaming operator may notify the team and or its members when a team goal has been met and what the team reward or benefit is. The notification of a team or team member may occur, for example, by mail, e-mail, computer web or network, telephone, television, pager, fax, kiosk or any other possible method. When a particular team reaches a team goal, the gaming operator may then notify all other teams and/or their members and/or all members of the reward program of a team's accomplishment and the team reward or benefit provided to the team or its members.

It should be appreciated that rewards programs and the methods for gaming (i.e., the game(s) that players play to earn a team reward) may be played "manually" (e.g., using paper keno or bingo tickets) or on computers. In one embodiment, the game, the game sessions, and the game play may be partially or fully automated using one or more computer systems. For example, according to one embodiment, a team player may participate in an online game session playing a first game, using a plurality of networked computers. A team reward may be available to a team who, at the end of a game session (e.g., at the end of a predetermined time period) has completed the team goal. Team rewards may be accrued by a team and each team member may be able to view the accumulated team reward, which may include viewing an individual team member's portion of that reward.

A computer system may include a single computer that may be, for example, a microcomputer, a mainframe, or a personal computer. A computer system used to execute a game program that runs a game, any associated game sessions, and any reward program may also include any combination of computer system types that cooperate to accomplish system-level tasks. Multiple computer systems may also be used to run a game or a rewards program. The computer system also may include input or output devices, displays, or storage units. It should be appreciated that any computer system or systems may be used, and the invention is not limited to any number, type, or configuration of computer systems.

Figure 3:
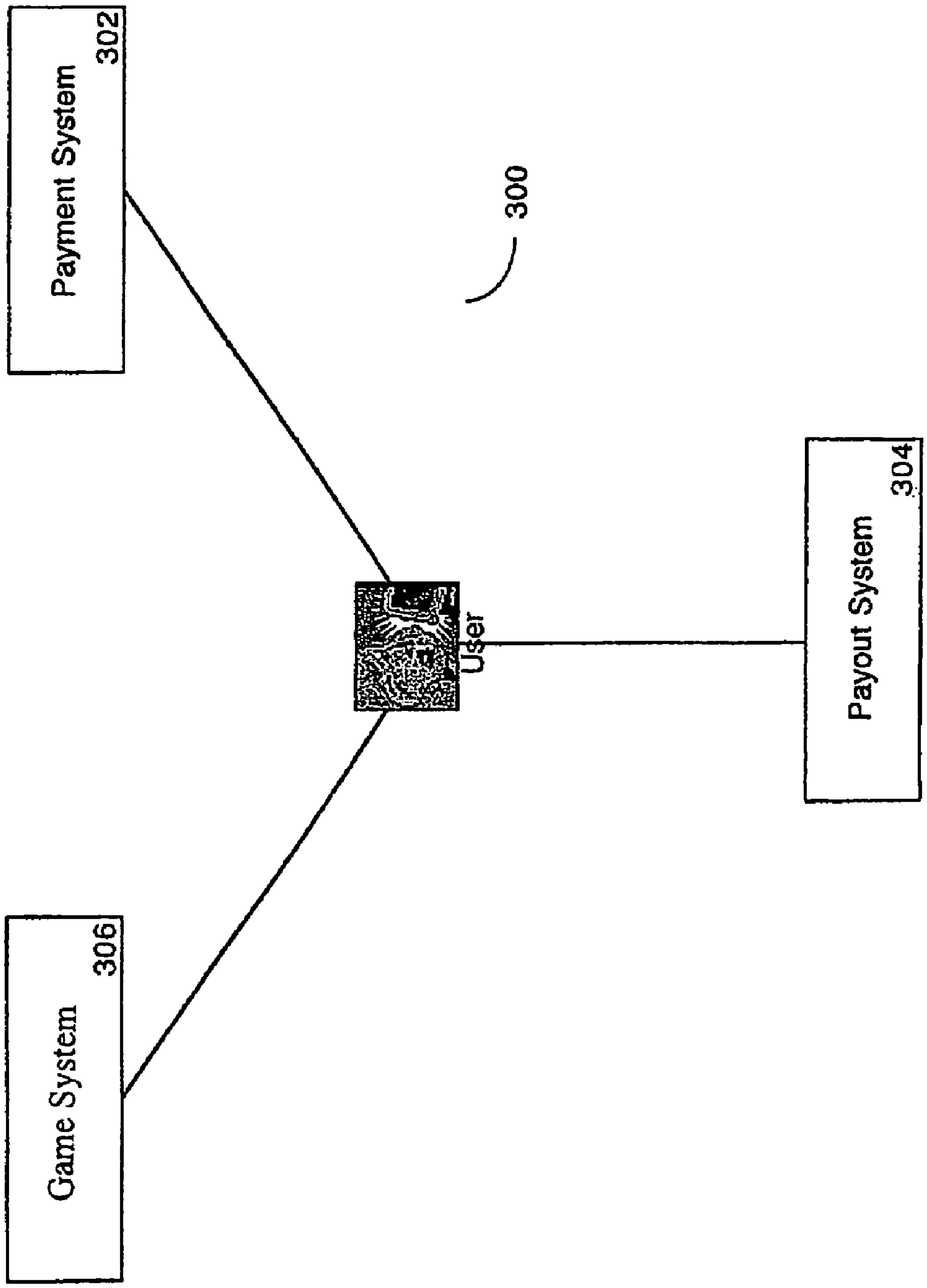
FIG. 3 is a block diagram illustrating one embodiment of a computer system according to aspects of the invention.

A computer system (e.g., computer system 300, FIG. 3) that may perform the rewards program, its various embodiments, and may execute the methods of gaming according to the various embodiments of the invention may include, for example, one or more component systems (e.g., systems 302, 304, and/or 306 as shown in FIG. 3). One system component (e.g., payment system 302) may handle payment, subscription and/or alternate method of entry (AMOE) by players to enter the game sessions. Another system component (e.g., gaming system 306) may handle playing and viewing the game and may handle running and viewing the rewards program. Yet another system (e.g., payout system 304) may handle making payouts to players. Such a computer system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

The payment component 302 may include one or more of a number of well-known systems. For example, a team player may be able to pay to play one or more games using a telephone and speaking with a call center representative who inputs team player, payment and subscription information manually into a computer using a user interface. In the computer, data may be stored in a data structure that is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick), etc., and any combinations thereof.

In addition, according to some embodiments, team player information may be stored and linked to team game progress. For example, when a team member completes some part or the entirety of a team goal, information (e.g., game played and number of game sessions) may be recorded by a computer so that the team goal is satisfied. This recording may be automatic for games played on a computer or may be controlled by, for example, a casino employee.

Team player information may also be entered into a payment system component (e.g., system 302). Team player information that may be input includes name, address, telephone number, and age, and payment information may include credit or debit card number or loyalty account information. A similar system may exist for team players entering using the mail or a post card AMOE except the call center may be replaced by a mail center having representatives that enter information into one or more computers via a user interface. For example, a cashier who works at a casino directly with team players that pay cash or credit to play, may also have the ability to input team player, account, and subscription information for AMOE players using a user interface of a computer. In one embodiment, team players may receive or may purchase a membership card that stores team player information and may be used to track a team player's participation in games that would satisfy the team goal. In one example, the membership card may be replaced by, or may include, for example, a hotel room keycard at a casino.

Computer systems or pay engines for handling electronic or online payment and subscriptions may also be used. Such systems are well known, and include such systems as PayPal, iKobo, Verisign, and other systems. Using such a system, a team player interacts with a user interface to input information into a payment data structure that may be transferred to one or more payment systems (e.g., PayPal).

Various pay systems and one or more user interfaces may be located on computer systems coupled by a network with the computer system(s) storing data having team player, account, and subscription information. As used herein, a "network" or a "communications network" is a group of two or more devices interconnected by one or more segments of transmission media or active communications equipment on which communications may be exchanged between the devices. Payout systems (e.g. payout system 304) are also well known. Any of a number of standard systems or payout engines for making payouts for winning may be used.

A gaming system (e.g., system 306 as shown in FIG. 3) according to one embodiment of the invention may comprise of a number of components for performing specific functions. These components may include, for example, storage means that store data structures having information relating to gaming events and odds. For example, such information may include event date, time, and location, team player's gaming and win/loss history, and game odds and their dependence upon time of payment. A game system may also include components to access payment and payout data structures.

The process in FIG. 1 and the other methods of the present invention, acts thereof and various embodiments and variations of those methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 4, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the rewards program and the gaming system may include a software component (e.g., a driver) that streams video via a broadband, satellite or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of reward and gaming systems. Such an illustrative embodiment is not intended to limit the scope of the invention, as any of numerous other implementations of a sports and event betting system, for example, variations of conditional access, are possible and are intended to fall within the scope of the invention. None of the claims set forth below are intended to be limited to any particular implementation of a reward and gaming systems unless such claim includes a limitation explicitly reciting a particular implementation.

System 300, and components thereof such as the payment, payout and gaming system, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of system 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 4 and 5.

System 300 is merely an illustrative embodiment of the game system. Such an illustrative embodiment is not intended to limit the scope of the invention, as any of numerous other implementations of the sports and event betting system, for example, variations of system 300, are possible and are intended to fall within the scope of the invention. For example, interactive television may also be used to view the available bets. None of the claims set forth below are intended to be limited to any particular implementation of the betting system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

Figure 4:
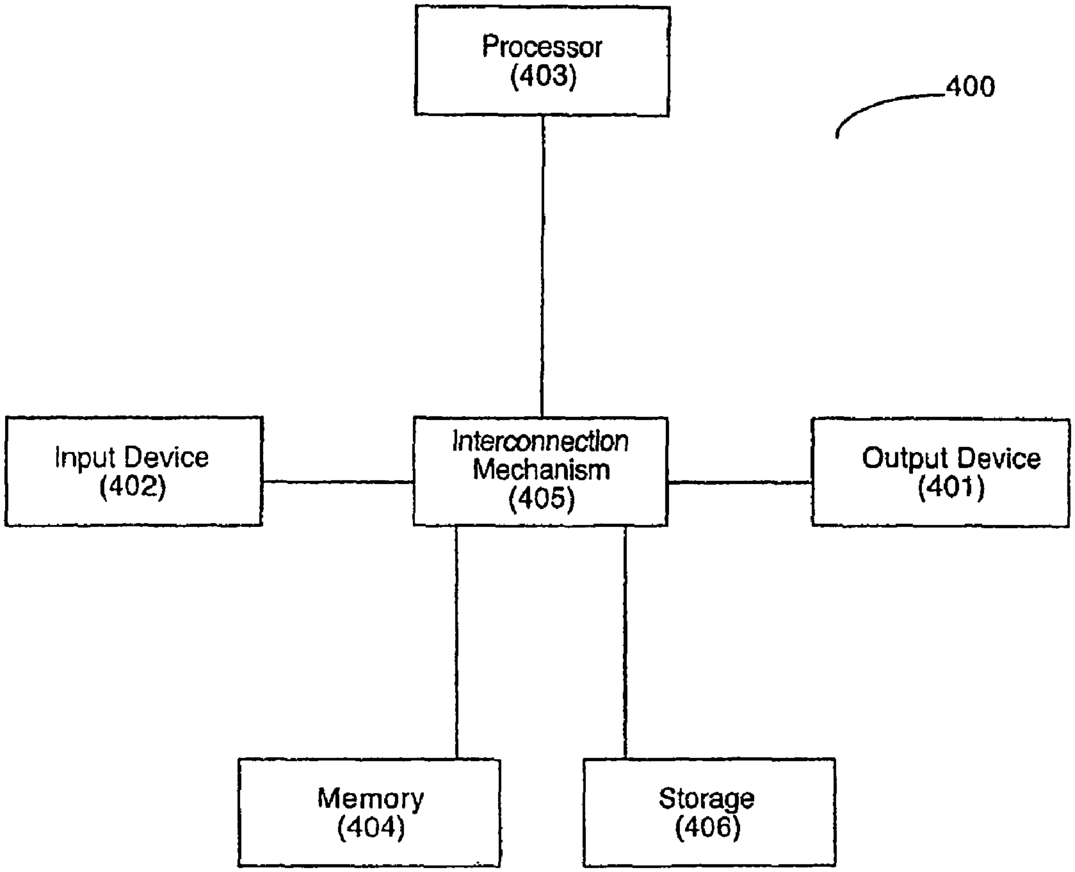
FIG. 4 is a block diagram of a general-purpose computer system upon which various embodiments of the invention may be implemented.

For example, various aspects of the invention may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, or speaker. In addition, computer system 400 may contain one or more interfaces (not shown) that connect computer system 400 to a communication network (in addition or as an alternative to the interconnection mechanism 405.

Figure 5:
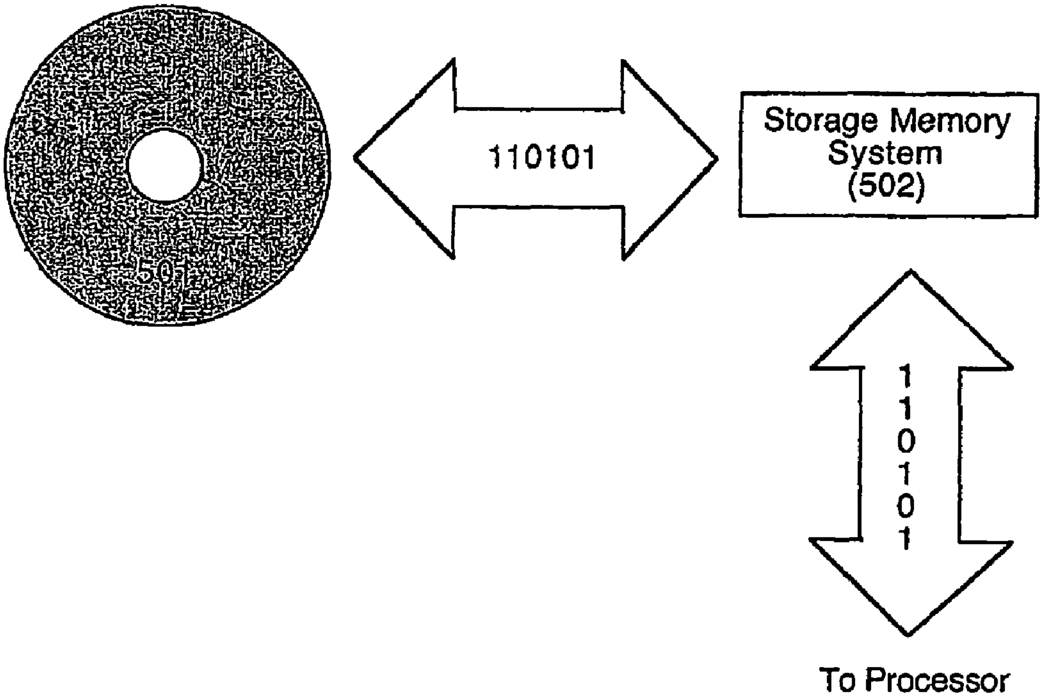
FIG. 5 is a block diagram of a computer data storage system with which various embodiments of the invention may be practiced.

The storage system 406, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

It is to be appreciated that the principles of the invention, including providing additional incentive to players, apply equally to manually operated games or computer-based games that may be played on a dedicated computing machine or over a network such as the Internet.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A gaming system having a rewards program associated with at least one game and comprising:

a storage element that stores information identifying at least two program members;

a team identifier that links the at least two program members as members of a team;

the storage element configured to store information identifying a team goal requiring that the members play a predetermined number of game sessions of the at least one game within a predetermined time period that is completed at an end of a first game session of the at least one game and linked to participation in the first game session of the at least one game by one or more of the members of the team;

a reward counter that stores rewards earned by any member of the team to accumulate a team reward based at least in part on the team goal, wherein the team reward is accomplishment oriented and awarded independent of and free from game play results, wherein a level by which the team reward improves odds of winning within the at least one game of which the first game session is a part is determined by the team goal and at least one of the team size or activity when the team accomplishes the team goal;

wherein the team gains better odds on the at least one game of which the first game session is part when the team accomplishes the team goal at the end of the first game session, wherein the team goal is accomplished after completion of the first game session of the at least one game; and the game system configured to notify at least one of the members of the team of the team reward.

2. The gaming system of claim 1, wherein the at least one game is a game of chance.

3. The gaming system of claim 1, wherein the rewards program is operated by a game operator that is an organization offering the at least one game.

4. The gaming system of claim 3, wherein the at least one game includes one casino betting game.

5. The gaming system of claim 3, wherein the at least one game includes at least one of poker, blackjack, keno, bingo, slots, or roulette.

6. The gaming system of claim 3, wherein the at least one game includes a lottery.

7. The gaming system of claim 3, wherein the organization is at least one of a lottery agency, a land-based casino, an on-line casino, or a bingo hall.

8. The gaming system of claim 3, wherein the team reward is evenly divided among the team members by the game operator.

9. The gaming system of claim 1, wherein the team reward is provided to the team as a whole.

10. The gaming system of claim 1, wherein the team reward is provided to the team members on a prorated basis.

11. The gaming system of claim 1, wherein the team reward is time-dependent or time constrained.

12. The gaming system of claim 11, wherein the team reward is not dependent upon winning of the at least one game by any of the team members.

13. The gaming system of claim 1, wherein the at least one game includes multiple games and wherein the team reward is game dependent.

14. The gaming system of claim 1, wherein the team reward includes at least one of money, credit, merchandise, an adjustment in rules of play of at least one game, or loyalty points.

15. A method of team gaming comprising acts of:

providing a gaming system for a first player to join a rewards program;

providing, by the gaming system, for a second player to join the rewards program;

identifying the first and second players as members of a team;

providing, by the game system at least one team goal requiring that the members play a predetermined number of game sessions of the at least one game within a predetermined time period goal that is linked to the players participation in a first game session of at least one game and completed at an end of the first game session;

storing, by use of a storage element of the gaming system, information identifying the team goal;

accumulating, by use of a reward counter of the gaming system, a team reward based on the players achieving the at least one team goal, wherein the team reward is accomplishment oriented and awarded independent of and free from game play results, wherein a level by which the team reward improves odds of winning within the at least one game of which the first game session is a part is determined by the team goal and at least one of the team size or activity when the team achieves the team goal at the end of the first game session of the at least one game;

gaining, when the team accomplishes the team goal at the end of the first game session, better odds on the game of which the first game session is a part; and notifying the players of the team reward via the gaming system.

16. The method of claim 15, wherein the team goal includes an act of requiring that the players play a predetermined number of game sessions of the at least one game within a predetermined time period.

17. The game system of claim 1, further comprising an individual reward counter that stores individual rewards earned for actions associated with the team.

18. The gaming system of claim 1, further comprising a reward adjustment counter that modifies the reward based on predefined characteristics.

19. The gaming system of claim 2, wherein the game of chance is purely a game of chance.

20. The method of claim 15, further comprising acts of: providing for the first player to invite the second player to become a member of a team; and providing for the second player to accept an invitation to become a member of a team.

21. The method of claim 15, further comprising an act of providing for a player to join a preexisting team.

22. The method of claim 15, wherein the at least one game includes at least one of a game of chance, a game of skill, a casino betting game, or a lottery.

23. The method of claim 15, wherein the method of team gaming is performed by a game operator that offers the at least one game.

24. The method of claim 23, wherein the game operator includes at least one of a lottery agency, a land-based casino, an on-line casino, or a bingo hall.

25. The method of claim 15, further comprising an act of adjusting the team reward based on predefined characteristics.

26. The method of claim 15, further comprising an act of providing an individual reward for actions associated with the team.

27. The method of claim 15, further comprising an act of distributing the team reward.

28. The method of claim 15, further comprising an act of displaying to the members of a team progress of the team towards the team goal.

29. A non-transitory computer-readable medium having computer-readable signals stored thereon that define instructions that, as a result of being executed by a computer, instruct the computer to perform a method of team gaming, the method comprising acts of:

providing for a first player to join a rewards program;

providing for a second player to join the rewards program;

identifying the first and second players as members of a team;

providing at least one team goal requiring that the members play a predetermined number of game sessions of the at least one game within a predetermined time period that is completed at an end of a game session of at least one game and that is linked to the players participation on the game session of the at least one game;

accumulating a team reward based on at least one of the players achieving the at least one team goal at the end of the game session of the at least one game, such that the team reward is accomplishment oriented and awarded independent of and free from game play results, wherein a level by which the team reward improves odds of winning within the at least one game of which the game session is a part is determined by the team goal and at least of the team size or activity when at least one of the players achieves the at least one goal at the end of the game session of the at least one game; and gaining, when the team accomplishes the team goal at the end of the game session, better odds on the game of which the first game session is a part.

30. The computer-readable medium of claim 29, wherein the at least one team goal is limited by a predetermined time interval.

31. The computer-readable medium of claim 29, wherein the method further comprises acts of:

providing for the first player to invite the second player to become a member of a team; and providing for the second player to accept an invitation to become a member of a team.

32. The computer-readable medium of claim 29, wherein the method further comprises an act of providing for a player to join a preexisting team.

33. The computer-readable medium of claim 29, wherein the method of team gaming is performed by a game operator that offers the at least one game.

34. The computer-readable medium of claim 29, wherein the method further comprises an act of adjusting the team reward based on predefined characteristics.

35. The computer-readable medium of claim 29, wherein the method further comprises an act of providing an individual reward for actions associated with the team.

36. The computer-readable medium of claim 29, wherein the method further comprises an act of displaying a record of progress toward the team goal and an act of distributing the team reward.

37. A system for playing a team game on a computer system, the system comprising:

a gaming system configured to provide for a first player to join a rewards program;

the gaming system configured to providing for a second player to join the rewards program;

the gaming system configured to identify the first and second players as members of a team;

the gaming system configured to provide at least one team goal requiring that the members play a predetermined number of game sessions of the at least one game within a predetermined time period that is linked to the players participation in a first game session of the team game and completed at an end of the first game session of the team game; and the gaming system configured to accumulate at team reward based on the players achieving the at least one team goal, such that the team reward is accomplishment oriented and awarded independent of and free from game play results, wherein a level by which the team reward improves odds of winning within the team game of which the game session is s part is determined by the at least one team goal and at least one of the team size or activity when at least one of the players achieves the at least one team goal, wherein, when the team accomplishes the at least one team goal at the end of the first game session, the team gains betters odds on the team game of which the first game session is a part.

* * * * *